(12) United States Patent
Grech et al.

(10) Patent No.: US 9,516,501 B2
(45) Date of Patent: Dec. 6, 2016

(54) AUTHENTICATION IN A COMMUNICATIONS SYSTEM

(76) Inventors: Sandro Grech, Barh (GB); Christophe Gruet, Montigny le Bretonneux (FR)

( * ) Notice: Subject to any disclaimer, the term of this patent is extended or adjusted under 35 U.S.C. 154(b) by 23 days.

(21) Appl. No.: 14/007,039

(22) PCT Filed: Feb. 23, 2012

(86) PCT No.: PCT/EP2012/001283
§ 371 (c)(1),
(2), (4) Date: Sep. 24, 2013

(87) PCT Pub. No.: WO2012/126634
PCT Pub. Date: Sep. 27, 2012

(65) Prior Publication Data
US 2014/0051394 A1   Feb. 20, 2014

(30) Foreign Application Priority Data
Mar. 24, 2011   (EP) .................... 11290148

(51) Int. Cl.
*H04W 12/06* (2009.01)
*H04L 29/06* (2006.01)

(52) U.S. Cl.
CPC ............ *H04W 12/06* (2013.01); *H04L 63/08* (2013.01); *H04L 63/105* (2013.01)

(58) Field of Classification Search
CPC ..... H04W 12/06; H04L 63/08; H04L 63/105
USPC .................................... 455/410–411
See application file for complete search history.

(56) References Cited

U.S. PATENT DOCUMENTS 8,555,344 B1 * 10/2013 Wiedmann et al. ............ 726/4
2006/0174330 A1 * 8/2006 Yoon et al. ..................... 726/4

FOREIGN PATENT DOCUMENTS

EP            2200358 A2    6/2010
WO    WO-2009/045895 A1    5/2009

OTHER PUBLICATIONS

International Search Report for related International Application No. PCT/EP2012/001283; report dated Aug. 3, 2012.

* cited by examiner

*Primary Examiner* — Marisol Figueroa
(74) *Attorney, Agent, or Firm* — Miller, Matthias & Hull LLP

(57) ABSTRACT

To provide a user equipment with a restricted access to network services in situation when authentication of the user equipment by means of a first shared secret, known only by the user equipment and an authentication center is not possible because of a system failure, the user equipment is authenticated by means of a second shared secret in an access point node, the authentication procedure being otherwise the same.

13 Claims, 5 Drawing Sheets

AUTHENTICATION IN A COMMUNICATIONS SYSTEM

CROSS-REFERENCE TO RELATED APPLICATIONS

This application is a 35 USC §371 U.S. national stage filing of International Patent Application No. PCT/EP2012/001283 filed on Mar. 23, 2012, which claims priority under the Paris Convention and 35 USC §119 to European Patent Application No. 11290148.3, filed on Mar. 24, 2011.

FIELD OF THE DISCLOSURE

The present invention relates to authentication of an apparatus in a communications system.

BACKGROUND OF THE DISCLOSURE

The following description of background art may include insights, discoveries, understandings or disclosures, or associations together with disclosures not known to the relevant prior art to the present invention but provided by the invention. Some such contributions of the invention may be specifically pointed out below, whereas other such contributions of the invention will be apparent from their context.

One of the key features of telecommunications systems, especially in wireless telecommunications systems, is authentication of a user to prevent illegal access. Authentication is a procedure in which one party authenticates the other party according to an agreed procedure which is typically based on passwords and/or keys, and which may be transparent to the user. In mobile networks, the network security access mechanisms includes a mutual authentication of a user, or more specifically a subscriber identity module used by the user with a terminal providing network interfaces, and a network, and the authentication is typically based on challenge-response based mechanism that uses symmetric cryptography. In the mechanism, a secret key is permanently stored to a subscriber identity module and in an authentication centre of the subscriber's home environment (home network), the permanent root key being a root key used by the subscriber identity module and the authentication centre as an input in different algorithms, such as calculating an authentication response, a cipher key, an integrity key and/or an anonymity key, for example, in the authentication phase. The permanent root key is never transmitted but the authentication centre may calculate a certain number of authentication vectors with which the authentication may be performed in a network serving the user's device (and thereby the user), without the involvement of the authentication centre as many times as there are authentication vectors.

It may happen that authentication is impossible because the connection to the authentication centre is lost due to a network failure, and there are no authentication vectors available in the serving network. In the situation, the only service available is a call to an emergency center. However, there are situations in which it would be useful to have a little bit broader service, for example a call between two or more user equipments in the same radio access network.

WO 2008/031926 relates to a professional mobile radio called Terrestrial Trunked Radio (TETRA), in which mobile stations can communicate in a direct mode, i.e. directly with each other, or using trunked infrastructure called Switching and Management Infrastructure (SwMI). WO 2008/031926 discloses a mobile station having, in addition to an actual mobile equipment, at least two separate subscriber identity modules. A detachable subscriber module and the actual mobile equipment may authenticate each other by means of an off-system key stored in the subscriber modules and in the actual mobile equipment for authentication purposes between the subscriber module and the actual mobile equipment when a direct mode (a mode in which the trunked infrastructure is not involved in the communication) is to be used, or the serving trunked infrastructure is not available. If the authentication with the off-system key succeeds, a mobile station comprising the subscriber module and the actual mobile equipment may form a direct connection to another mobile station. However, that solution enables only calls between mobile stations that are close enough to each other so that they can communicate directly to each other without use of network resources.

SUMMARY OF THE DISCLOSURE

An object of the present invention is thus to provide a method and an apparatus for implementing the method so as to provide a restricted set of network services if the network is not available for conventional authentication. The object of the invention is achieved by methods, an apparatus, a computer program product and a system which are characterized by what is stated in the independent claims. The preferred embodiments of the invention are disclosed in the dependent claims.

An aspect of the invention provides in addition to a permanent shared secret, that is available only to a user's subscriber identity module and an authentication centre in the user's home environment, a further shared secret available in access network and in the subscriber identity module for authenticating the user for restricted use of the access network, when authentication based on the permanent shared secret, i.e. the conventional authentication, is not available.

An advantage of the invention is that it provides a mechanism for restricted access to an access network for entitled users without risking (compromising) the permanent shared secret.

BRIEF DESCRIPTION OF THE DRAWINGS

In the following, embodiments will be described in greater detail with reference to accompanying drawings, in which.

DETAILED DESCRIPTION OF THE DISCLOSURE

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any user equipment, access point node, corresponding component, and/or to any communication system or any combination of different communication systems that support user authentication by means of a shared secret. The communication system may be a fixed communication system or a wireless communication system or a communication system utilizing both fixed networks and wireless networks. The protocols used, the specifications of communication systems, access point nodes and user equipments, especially in wireless communication, develop rapidly. Such development may require extra changes to an embodiment. Therefore, all words and expressions should be interpreted broadly and they are intended to illustrate, not to restrict, the embodiment.

In the following, different embodiments will be described using, as an example of a system architecture whereto the embodiments may be applied, an architecture based on System Architecture Evolution (SAE), specified in 3GPP (Third Generation Partnership Project), without restricting the embodiment to such an architecture, however. Other examples of system architecture include WiMax, WiFi, 4 G (fourth generation) and Mobile Broadband Wireless Access (MBWA), iBurst, Flash-OFDMA, IPW, TETRA, 3 G (third generation).

Figure 1:
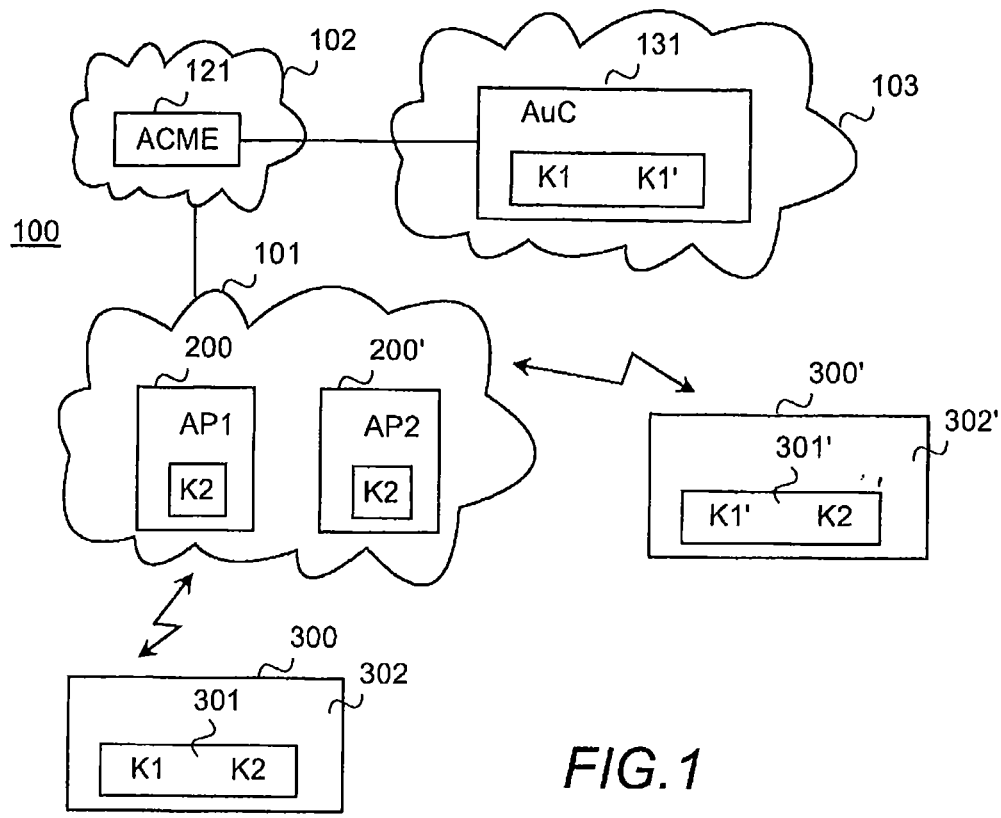
FIG. 1 shows simplified architecture of a system according to an embodiment.

A general architecture of a communication system providing authentication based on shared secrets is illustrated in FIG. 1. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for group communication, are irrelevant to the actual invention. Therefore, they need not to be discussed in more detail here.

In the embodiment illustrated in FIG. 1, the system 100 comprises a radio access network 101 providing access to the system for user equipments (UE) 300 and 300' by means of access point nodes 200 and 200', a core network 102, and a home environment 300.

The core network comprises an access security management entity (ACME) 121. ACME represents here any authentication server which is configured to retrieve authentication vectors from an authentication centre (AuC) 131 locating in the home environment 103 of the user equipment to be authenticated. Examples of ACME include a mobility management entity, (MME), a visitor location register, or corresponding network node, a serving packet gateway node, and a switching entity. The user equipment is authenticated by means of disposable authentication vectors calculated by the authentication centre using the shared secret, and during authentication the user equipment calculates responses using the shared secret.

Figure 2:
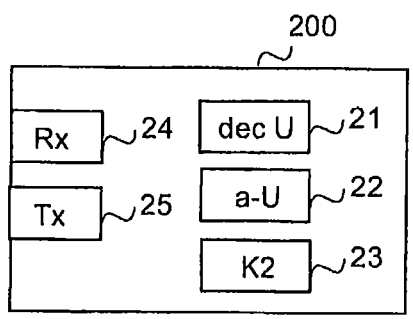
FIGS. 2 and 3 are block diagrams of an apparatuses according to embodiments.

The access point node 200 and 200' described in more detail with FIG. 2, may be any computing apparatus configured to provide user equipments access to core network services. Examples of such devices include a base station, node B, evolved node B, a multistandard base station, and a wireless access point.

Figure 3:
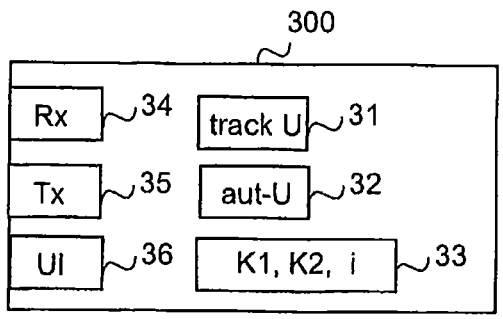

The user equipment 300 and 300', described in more detail with FIG. 3, may be any computing apparatus that consists of a subscriber identity module (SIM) 301 and 301', or corresponding information, for identifying a user (or the one who has made the subscription for the user), and the actual terminal 302 and 302' which is a piece of equipment or a device that associates, or is arranged to associate, the terminal and its user with a subscription and allows a user to interact with a communications system. The terminal presents information to the user and allows the user to input information. In other words, the user terminal may be any apparatus or a combination of several apparatuses capable of receiving information from and/or transmitting information to the network, connectable to the network wirelessly or via a fixed convection. The subscriber identity module includes the algorithms and secrets needed in authentication and it may further include information related to identification of the subscriber, such as an international mobile subscriber identity (IMSI) and a temporary mobile subscriber identity of the location area (TMSI) by means of which transmission of the IMSI over the radio path can be avoided. The subscriber identity module, in which the required information is stored, can be integrated in the terminal, in which case the required information may be stored in the memory of the terminal. Frequently, however, the subscriber identity module is located in a separate circuit to be detachably connected/attached to the terminal. Examples of such subscriber identity modules are so called SIM cards (smart cards) in which the required information is stored, a network interface card and a USB modem (a dongle). Herein "user equipment" UE generally refers to the entity formed by the subscriber identity module identifying the user and the actual terminal. Examples of use equipments include a user terminal or work station, such as a laptop, a netbook, a smartphone, a personal computer, a tablet computer, e-reading device, or a personal digital assistant (PDA).

In the illustrated example, it is assumed that user equipments have the same home environment, which is not always the case, and both of them have a different shared secret K1 and K1' for conventional authentication, stored in the corresponding SIM 301 and 301' and in the authentication centre. Below this shared secret is called a permanent root key. As described above, the permanent root key is never transmitted. Further, in the illustrated example, the access point nodes and the user equipments (in the illustrated example the SIM) comprises another shared secret K2, called below a further root key, which can be used instead of K1 in an authentication procedure, i.e. as a root key, as will be described later. The keys are interchangeable, i.e. no amendments to authentication algorithms and procedures are needed. In the example the further root key K2 is the same for all, and stored to the SIM at the same time as K1 and K1', and stored to a secure memory of an access point node 200, 200' when it is manufactured, for example, or transmitted securely over the network to the access point node, when the access point node is taken into use, without restricting the embodiment to such solutions. Depending on an implementation (and embodiment), K2 may be unique to each UE, or a group of UEs, same for all UEs served by an access point node, or a group of access point nodes. K2 may be bootstrapped by the user equipment or the access point node, and distributed to the other party if there is a secure fixed/wireless channel between the parties (for example, during a previous connection in which the permanent root key-based conventional authentication was used or using a secured side channel of another system, like WiFi), downloaded from the user equipment or the access point node to the other party over the secure channel. If the access point node obtains the further secure key K2 from the user equipment, the access point node may distribute the further secure key K2 to other access point nodes, as a part of a handover procedure, for example. It is also possible to combine the above described methods, for example storing, during manufacturing, an initial value to K2, and then override it with a further root key after a first successful conventional authentication. Further, the network side may be arranged to renew K2 according to a predetermined security policy, for example using a time-based renewal. Thus, therefore no restrictions relating to provisioning and updating K2, as long as they are reliable and guarantee that a third party does not obtain illegally information on K2.

FIG. 2 illustrates an exemplary block diagram of an apparatus providing an access point node functionality. For the sake of clarity the apparatus, or a corresponding component, is called herein as an access point node. The access point node 200 is a computing device comprising not only prior art means, but also means for implementing access point node functionality described with an embodiment and it may comprise separate means for each separate function, or means may be configured to perform two or more functions, and even to combine functions of different embodiments. These means may be implemented by various techniques. For example, the means may be implemented in hardware (one or more apparatuses), firmware (one or more apparatuses), software (one or more modules), or combinations thereof. For a firmware or software, implementation can be through units/modules (e.g., procedures, functions, and so on) that perform the functions described herein.

In other words, the access point node 200 is configured to perform one or more of client functionalities described below with an embodiment, and it may be configured to perform functionalities from different embodiments. For this purpose, the exemplary client illustrated in FIG. 2 comprises a mode detector unit (decU) 21, an authenticator unit 22 (a-U), and at least one memory 23 for storing one or more (depending on an implementation) further root keys K2 usable instead of the permanent root key in an isolated mode. The isolated mode means herein that the conventional authentication by means of the root key is not available because of a system failure, for example because of a link failure or a program failure or an overload situation. For example, in the isolated mode connection to ACME may be lost or it may that ACME does not contain authentication vectors and has lost connection to AuC and thereby cannot obtain more authentication vectors, and, as a result, cannot authenticate the user. In other words, in the isolated mode ACME is not available for authentication purposes. In the illustrated example the authenticator unit 22 is switched on, when the mode detector unit 21 detects an isolated mode, and switched off, when the mode detector unit 21 detects again a normal mode. The normal mode means herein a mode when the conventional authentication is available. When switched on, the authenticator unit 22 is configured to authenticate users by means of the further root key as will be described in more detail below with FIGS. 4 to 6 and 10. The mode detector unit 21 may be configured to detect the modes by means of conventional connection status checks, such as sending periodically messages like "hello" or "alive" for which echoing responses are waited for a predetermined time.

Further, the access point node may comprise other units, such as a key obtainer unit (not shown in FIG. 2) configured to obtain a further root key, if needed, and it comprises different interface units, such as one or more receiving units 24 for receiving different inputs, control information, requests and responses, for example, and one or more sending units 25 for sending different outputs, control information, responses and requests, for example. The receiving unit and the transmitting unit each provides an interface in the access point node, the interface including a transmitter and/or a receiver or a corresponding means for receiving and/or transmitting information, and performing necessary functions so that content, control information, etc. can be received and/or transmitted. The receiving and sending units may comprise a set of antennas, the number of which is not limited to any particular number.

Depending on an implementation, the access point node may or may not be configured to perform a procedure corresponding to a network triggered re-authentication that is triggered in predetermined intervals in a normal mode.

It should be appreciated that ACME functionality may be provided by a node controlling the access point node, such as a radio network controller or a base station controller, or that the access point node functionality relating to authentication, may be performed by the node controlling the access point node.

FIG. 3 illustrates an exemplary block diagram of an apparatus providing a user equipment functionality. For the sake of clarity the apparatus, or a combination of apparatuses/device, is called herein as a user equipment. The user equipment is a computing device comprising not only prior art means, but also means for implementing user equipment functionality described with an embodiment and it may comprise separate means for each separate function, or means may be configured to perform two or more functions, and even to combine functions of different embodiments. These means may be implemented by various techniques. For example, the means may be implemented in hardware (one or more apparatuses), firmware (one or more apparatuses), software (one or more modules), or combinations thereof. For a firmware or software, implementation can be through units/modules (e.g., procedures, functions, and so on) that perform the functions described herein.

In other words, the user equipment is configured to perform one or more of user equipment functionalities described below with an embodiment, and it may be configured to perform functionalities from different embodiments. For this purpose, the exemplary user equipment illustrated in FIG. 3 comprises a network mode tracking unit (trackU) 31, an authentication unit (aut-U) 32, and at least one memory 33 for storing at least a permanent root key K1, available only to the user's subscriber identity module and an authentication centre in the user's home environment, and the further root key K2, and the mode information. In the illustrated example it is assumed that the mode is isolated and that is denoted by i in the memory 33. It should be appreciated that it depends on implementation how the mode information is indicated and any means can be used for it. For example, no information may indicate a normal mode. The network mode tracking unit 31 is configured to receive on broadcast channel information on the network node and maintain in the memory information on the current network mode for the authentication unit 32, as will be described in detail below with FIGS. 7 to 10.

The user equipment comprises also other units, like a key obtainer unit (not shown in FIG. 3) configured to obtain a further root key, if needed, and it comprises different interface units, such as a user interface 36, and a receiving unit 34 for receiving different inputs, control information, requests and responses, for example, and a sending units 35 for sending different outputs, control information, responses and requests, for example. The receiving unit and the transmitting unit each provides an interface in the user equipment, the interface including a transmitter and/or a receiver or a corresponding means for receiving and/or transmitting information, and performing necessary functions so that content, control information, etc. can be received and/or transmitted. The receiving and sending units may comprise a set of antennas, the number of which is not limited to any particular number.

Each of the units in the access point node and/or in the user equipment may be a separate unit or integrated to another unit, or the units may be integrated together. It should be appreciated that the access point node and the user equipment may comprise other units used in or for communication. However, they are irrelevant to the actual invention and, therefore, they need not to be discussed in more detail here.

The access point node, the user equipment and corresponding apparatuses implementing functionality or some functionalities according to an embodiment may generally include a processor (not shown in FIGS. 2 and 3), controller, control unit, micro-controller, or the like connected to a memory and to various interfaces of the apparatus. Generally the processor is a central processing unit, but the processor may be an additional operation processor. The mode detector unit 21 and/or the authenticator unit 22, and/or the network mode tracking unit 31, and/or the authentication unit 32 may be configured as a computer or a processor, or a microprocessor, such as a single-chip computer element, or as a chipset, including at least a memory for providing storage area used for arithmetic operation and an operation processor for executing the arithmetic operation. The mode detector unit 21 and/or the authenticator unit 22, and/or the network mode tracking unit 31, and/or the authentication unit 32 may comprise one or more computer processors, application-specific integrated circuits (ASIC), digital signal processors (DSP), digital signal processing devices (DSPD), programmable logic devices (PLD), field-programmable gate arrays (FPGA), and/or other hardware components that have been programmed in such a way to carry out one or more functions of one or more embodiments. An embodiment provides a computer program embodied on any client-readable distribution/data storage medium or memory unit(s) or article(s) of manufacture, comprising program instructions executable by one or more processors/computers, which instructions, when loaded into an apparatus, constitute the mode detector unit 21 and/or the authenticator unit 22, and/or the network mode tracking unit 31, and/or the authentication unit 32. Programs, also called program products, including software routines, program snippets constituting "program libraries", applets and macros, can be stored in any medium, and may be downloaded into an apparatus. The data storage medium or the memory unit may be implemented within the processor/computer or external to the processor/computer, in which case it can be communicatively coupled to the processor/computer via various means, as is known in the art.

The memory may be volatile and/or non-volatile memory, for example EEPROM, ROM, PROM, RAM, DRAM, SRAM, firmware, programmable logic, double floating-gate field effect transistor, etc and typically store content, data, or the like, and the memory may store also other information for the authentication than one or more of the root keys, or corresponding shared secret, such as information on a current network mode or buffered information. Further, the memory may store computer program code such as software applications (for example, for the editing unit or the data publishing unit) or operating systems, information, data, content, or the like for the processor to perform steps associated with operation of the access point node and/or the user equipment in accordance with embodiments. The memory may be, for example, random access memory, a hard drive, other fixed data memory or storage device or any combination thereof. Further, the memory, or part of it, may be removable memory detachably connected to the access point node and/or the user equipment.

Although the access point node and the user equipment have been depicted as one unity, different processors, controllers, interfaces and/or memory may be implemented in one or more physical or logical units.

Figure 4:
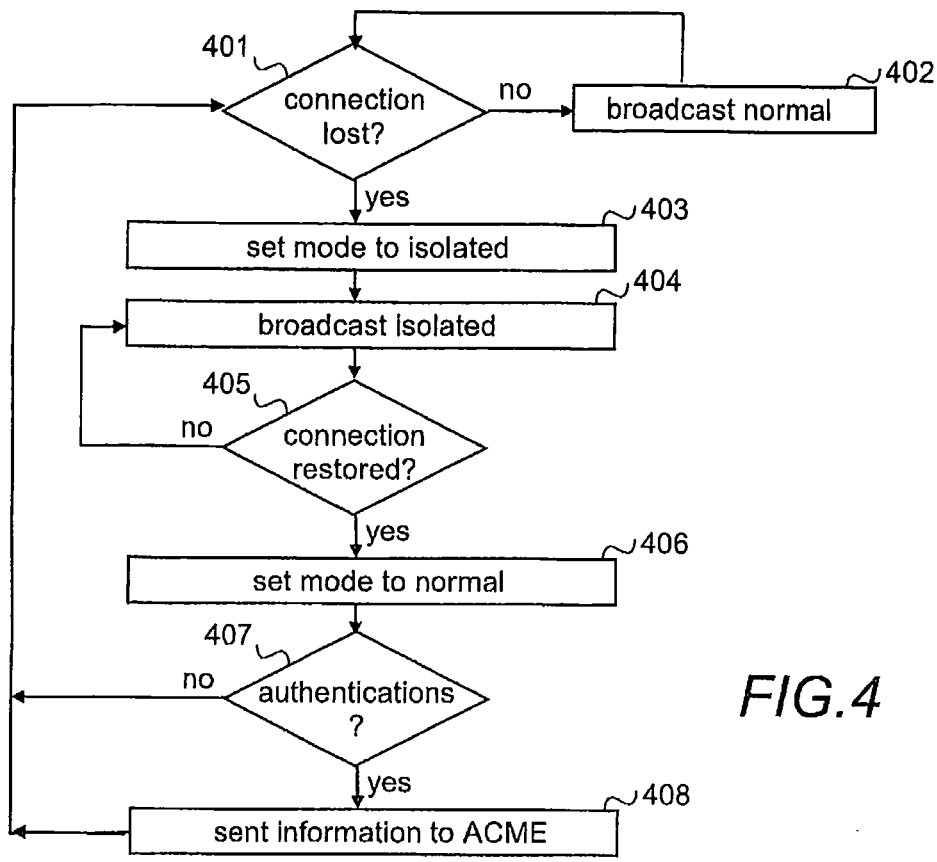
FIGS. 4 to 9 are flow charts illustrating different embodiments.
Figure 5:
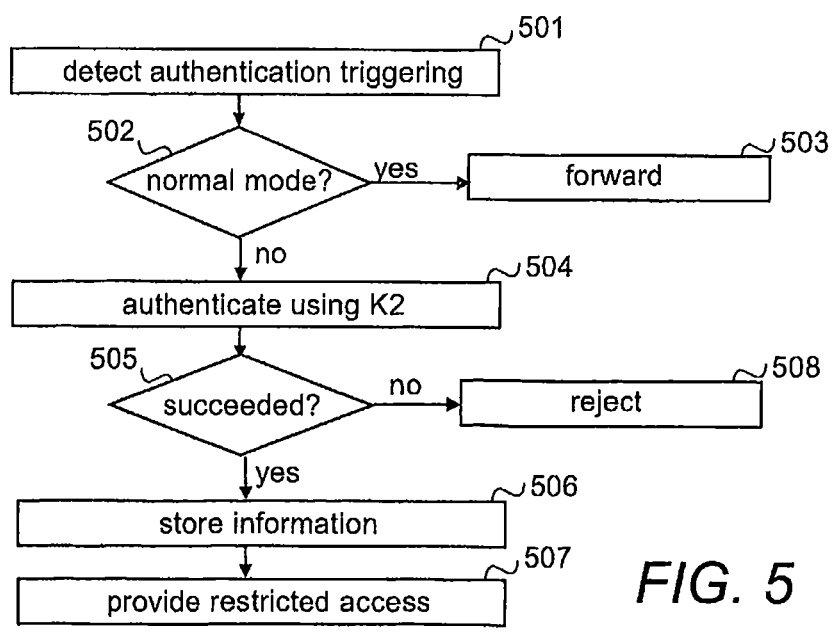

FIGS. 4 and 5 illustrate functionality of an access point node according to an embodiment in which the illustrated processes run parallel.

In step 401, the access point node monitors, whether or not a connection to a core network for authentication purposes is available, i.e. whether or not the connection is lost. If it is not lost (i.e. it is available), the access point node broadcasts, in step 402, as part of a system or network information in a broadcast control channel, an indication that the access point node is in a normal mode, and continues the monitoring (step 401).

If the connection is lost (step 401), i.e. the connection for the core network node is not available for the authentication purposes, the access point node sets, in step 403, the mode to an isolated mode, and broadcasts, in step 404, an indication that the access point node is in an isolated mode. In other words, the broadcast of step 402 is replaced with the broadcast of step 403. Then the access point node monitors, in step 405, whether or not the connection is restored. If not, the access point node proceeds to step 404 to broadcast information on the isolated mode. If the connection is restored (step 405), the access point node sets, in step 406, the mode to the normal mode, and if any authentication took place during the isolated mode (step 407), information on the authentication(s) is sent, in step 408, to the ACME so that it can trigger re-authentication, if needed. Then the process proceeds to step 401 to monitor the connection. If no authentication took place during the isolated mode (step 407), the process proceeds directly to step 401 to monitor the connection.

The indication in the broadcast may be a bit, which, when on, indicates the isolated mode, and when off, indicates the normal mode, or vice versa.

In some other embodiments, if there are user equipments authenticated during the isolated mode, the access point node may be configured to perform an autodetach to them before or after step 408, or instead of it.

FIG. 5 illustrates a situation, when the access point node detects, in step 501, a request triggering authentication of the user. The request may be an attach or a PDN (packet data network) connectivity request, for example. Therefore the access point node checks, in step 502, whether or not the mode is the normal mode. If the mode is the normal mode, the access point node forwards, in step 503, the request. (The authentication is in that case transparent to the access point node).

If the mode is not normal, it is isolated (step 502), and the access point node authenticates, in step 504, the user by using the further root key K2. As described above, the authentication is performed using the same processes and algorithms as with the permanent root key K1, except that the access point node itself uses the information in the authentication vector without sending it to other network nodes. It may be that only one authentication vector is generated when the further root key K2 is used. An example of an authentication procedure is a SAE authentication procedure. In the SAE authentication procedure, an authentication vector comprises following components; a random number RAND, an expected response XRES, a cipher key CK, an integrity key IK and an authentication token AUTN, and the parameters RAND and AUTN are send to the user equipment which checks whether AUTN can be accepted and, if so, computes CK and IK and produces a response RES which is sent back to the network which in turn compares the received RES with XRES, and if they match, the authentication is considered as successful.

If the authentication succeeds (step 505), the access point node stores, in step 506, information on the authentication, the information being used, as described above, when the mode is again a normal mode, to inform ACME on performed authentications. The access point node also provides, in step 507, the user with a restricted access to the access network, so that user equipments may communicate with each other via the access point node, and possible via other access point nodes in the same access network.

If the authentication fails (step 505), the access point node rejects, in step 508, the request.

Figure 6:
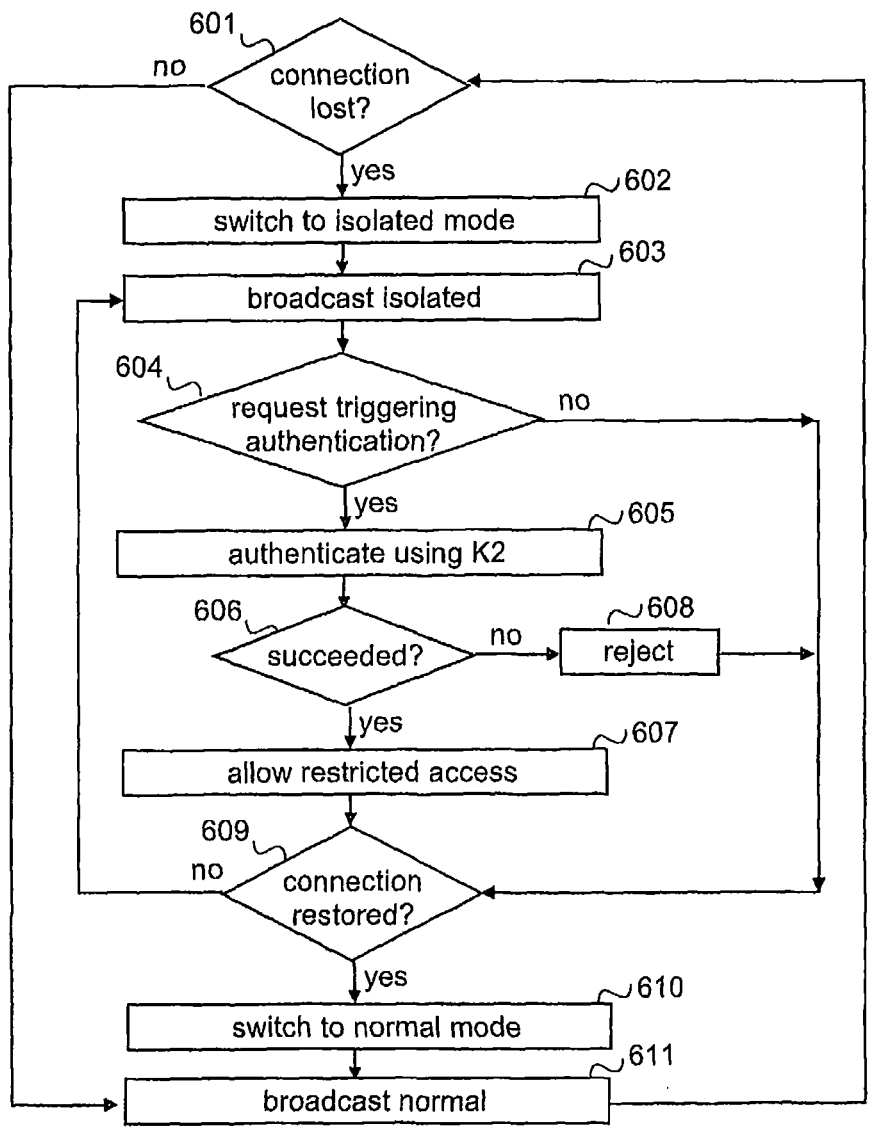

FIG. 6 illustrates the functionality of an access point node according to another embodiment. In step 601, the access point node monitors, whether or not a connection to a core network for authentication purposes is available, i.e. whether or not the connection is lost. If the connection is lost, the access point node switches, in step 602, to the isolated mode, and broadcasts, in step 603, an indication that the access point node is in, an isolated mode. In the isolated mode, the access point node monitors, in step 604, whether a request triggering authentication is received, and if such a request is received, the access point node authenticates, in step 605, the user by using the further root key K2. As described above, the authentication is performed using the same processes and algorithms as with the permanent root key K1. If the authentication succeeds (step 606), the access point allows, in step 607, to the authenticated user equipment a restricted access to the radio access network. If the authentication fails (step 606), the request triggering the authentication is rejected in step 608. Meanwhile (i.e. if no request triggering authentication in step 604 or after step 607 or after step 608), the access point node monitors, in step 609, whether or not the connection is restored. If not, the access point node proceeds to step 603 to broadcast information on the isolated, mode. If the connection is restored (step 609) the access point node switch, in step 610 to the normal mode. Then the access point node broadcast, in step 611, an indication indicating the normal mode, and proceeds to step 601, to monitor, whether or not a connection to a core network for authentication purposes is available, and as long as it is available, performs the monitoring and broadcasting an indication on the normal mode. During the normal mode the access point node ignores requests merely forwarding them.

Figure 7:
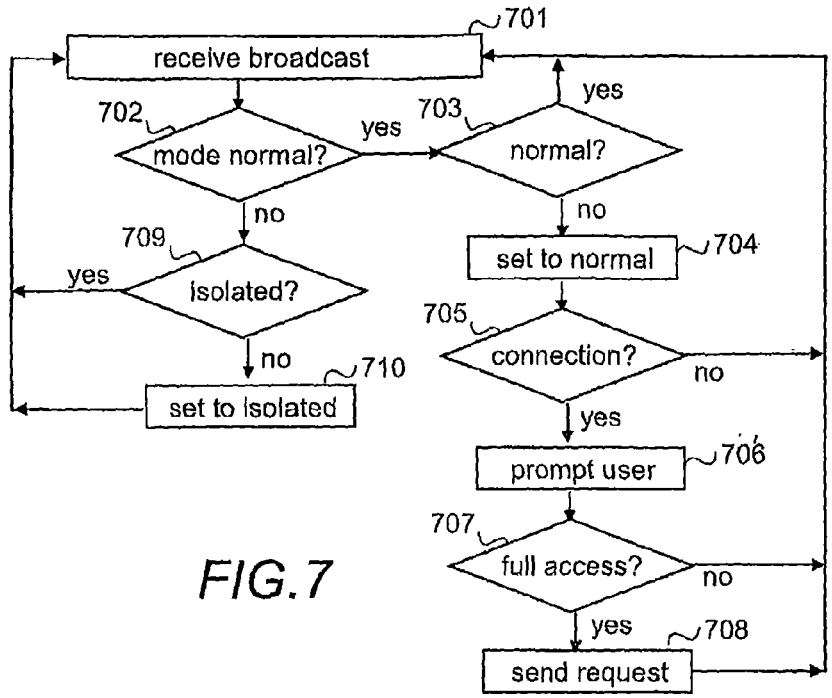
Figure 8:
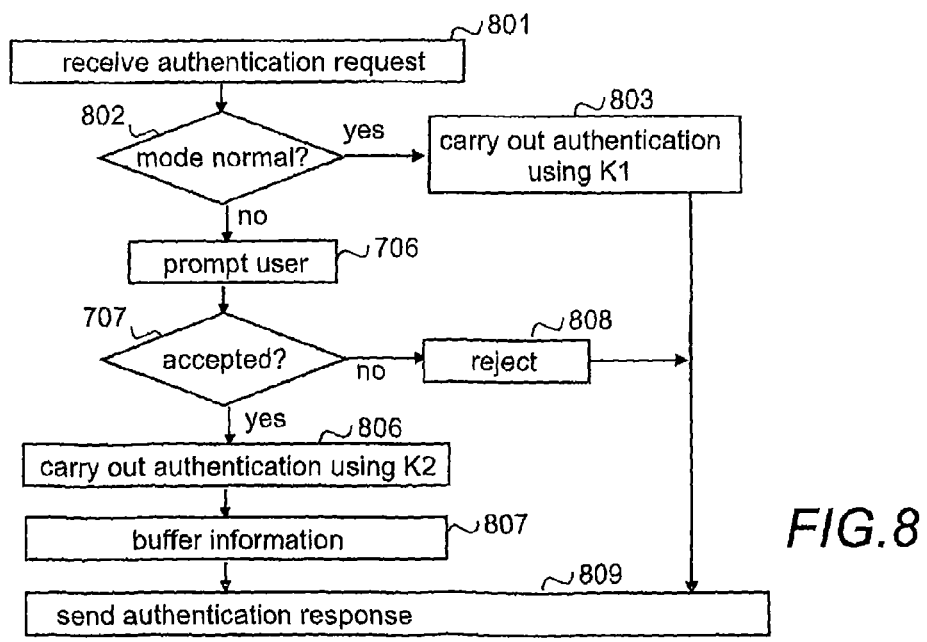

FIGS. 7 and 8 illustrate functionality of a user equipment according to an embodiment in which the illustrated processes run parallel.

FIG. 7 starts, when the user equipment receives, in step 701, a broadcast. Then the user equipment checks, in step 702, whether the network mode is normal. If the broadcast indicates the normal mode, the user equipment checks, in step 703, whether the mode information maintained in the user equipment indicates normal. If both of them are normal (i.e. steps 702 and 703), the process proceeds to step 701 to receive broadcast.

If the mode information maintained in the user equipment indicates the isolated mode (step 703), the mode information is set, in step 704; to indicate the normal mode. Then it is checked, in step 705, whether the user equipment has an isolated mode connection with restricted access going on. If yes, the user is prompted, in step 706, on the possibility to obtain a full network access. If the user wants the full network access (step 707), a request triggering authentication (step 708) is sent to the network, and then the process proceeds to step 701 to receive broadcast.

If there is no isolated mode connection (step 705) or the user does not want to obtain full network access (step 707), the process proceeds to step 701 to receive broadcast.

If the broadcast indicates the isolated mode (step 702), the user equipment checks, in step 709, whether the mode information maintained in the user equipment indicates isolated. If both of them are isolated (i.e. steps 702 and 709), the process proceeds to step 701 to receive broadcast.

If the mode information indicates the normal mode (step 709), the mode information is set, in step 710, to indicate isolated mode. Then the process proceeds to step 701 to receive broadcast.

FIG. 8 illustrates the functionality of the user equipment when an authentication request is received (step 801). In the illustrated example it is assumed, for the sake of clarity, that authentications succeed, and that SAE authentication procedure is used. However, it should be appreciated that any other authentication procedure, based preferably on shared secret and challenge-response, may be used.

In response to the authentication request, the user equipment checks, in step 802, whether or not the network operates in the normal mode. If the mode is normal, the user equipments carries out, in step 803, the authentication using the permanent root key K1. As explained above, the user equipment verifies the freshness of the authentication vector by means of a token received in the request, and computes a response by using the permanent root key and a random number received as a challenge in the authentication requests, the response being then sent to the network in step 809. The user equipment calculates, as part of the authentication, keys used for ciphering and integrity.

If the mode is isolated (step 802), the user equipment prompts, in step 804, the user on the restricted access. If the user accepts the restricted access (step 805), the user equipment carries out, in step 806, the authentication using the further root key K2, and buffers, in step 807, information on isolated mode authentication for the above described purpose, and then sends, in step 809, an authentication response towards the network. The authentication procedure performed in step 806 is the same as the one performed in step 803, the only difference is the used key.

If the user does not accept the isolated mode (step 805), the user equipments rejects, in step 808, the authentication, and sends, in step 802, as an authentication response, an authentication reject.

Figure 9:
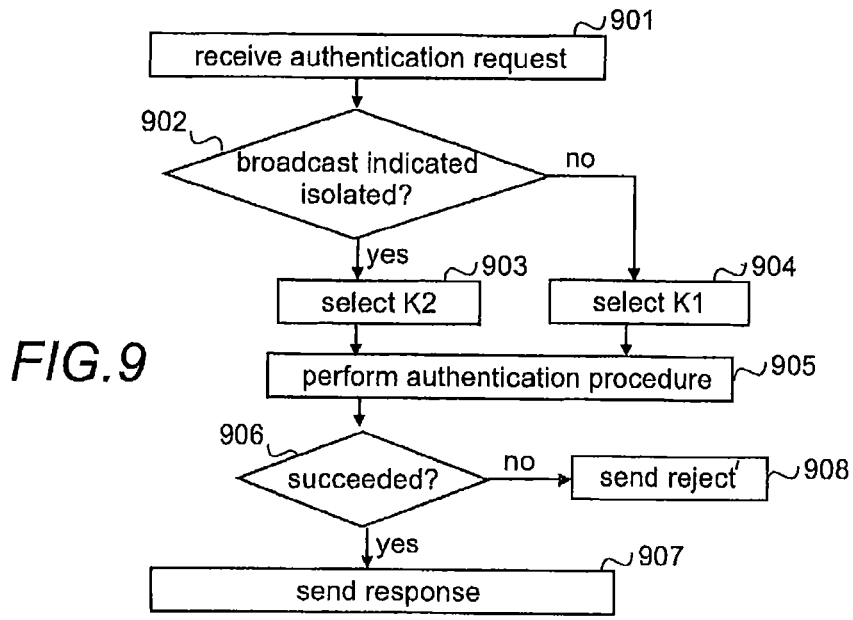

FIG. 9 is a flow chart illustrating functionality of a user equipment according to another embodiment. In the embodiment, when the user equipment receives, in step 901, an authentication request, it selects a key to be used with the authentication by checking, in step 902, whether the latest received broadcast indicated the isolated mode. If it indicated isolated mode, the further root key K2 is selected, in step 903, otherwise the permanent root key K1 is selected, in step 904. Then the authentication procedure, for example a procedure as described above with FIG. 8, is performed, in step 905 using the selected key. In the illustrated example, if the authentication of network succeeded (for example, the token was verified successfully), in step 906, the user equipment sends, in step 907 the calculated response to the network, otherwise the user equipment sends, in step 908, a rejection.

Figure 10:
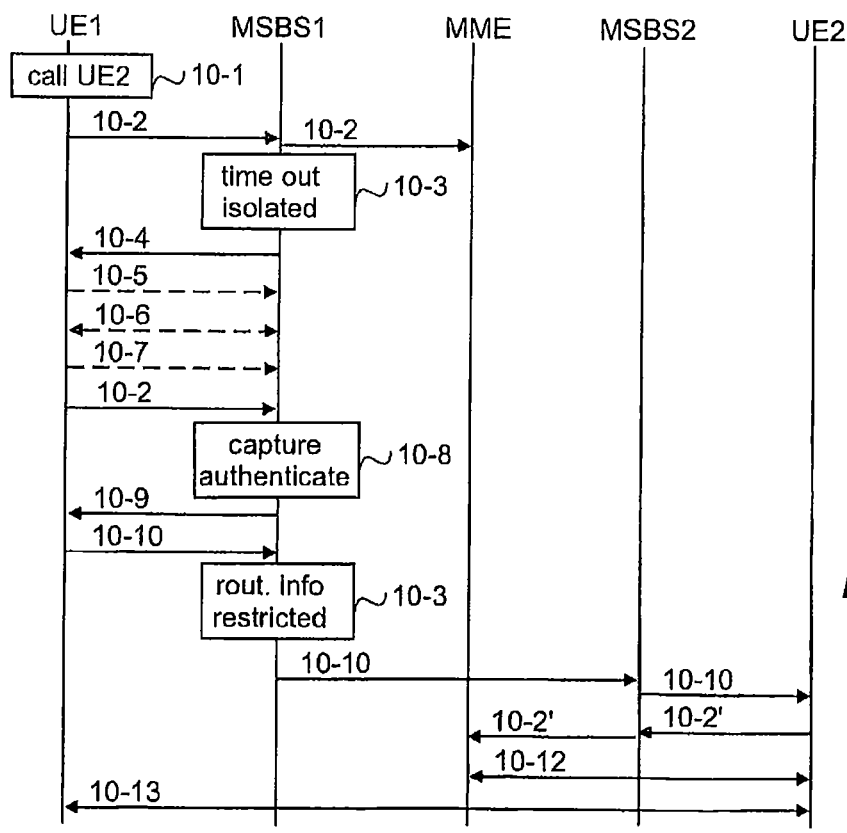
FIG. 10 is a signalling chart according to an embodiment.

FIG. 10 is an exemplary signalling flow chart according to a further embodiment. In the illustrated example, access point nodes in the same radio access network of SAE are multistandard base stations MSBS1 and MSBS2 supporting at least TETRA and radio access of SAE and being configured to be ACMEs for TETRA, a first user equipment UE1 is a multistandard user equipment supporting TETRA and SAE, but a second user equipment UE2, with which the first user equipment UE1 wants to have a call, supports only SAE, and user equipments happen to be in the area of the same SAE radio access network, such as a long term evolution (LTE), or evolved LTE. SAE messaging is illustrated by solid lines, TETRA messaging by dashed lines.

In the illustrated example, it is assumed that both MSBS1 and MSBS2 assume to be in the normal mode and broadcast "normal mode indicator" in system information of SAE. However, broadcast is not illustrated in FIG. 10. Therefore, when UE1 detects, in point 10-1 that the user wants to call to UE2, UE1 sends message 10-2, the message being an "attach to SAE", via the MSBS1 serving the UE1, to a mobility management entity MME performing authentications. In the illustrated example, a link failure has happened between MSBS1 and MME, and the MSBS1 detects, in point 10-3, a "time out" situation, i.e. the fact that a response to a forwarded request is not received in time, and switch to isolated mode for SAE. An indication of the isolated mode is broadcasted by MSBS1 but this is not shown in FIG. 10. The MSBS2 continues to be in a normal mode.

In the embodiment, MSBS1 knows, based on terminal information submitted in message 10-2, that UE1 supports also TETRA, and therefore sends to UE1 message 10-4 to attach to TETRA, and, in the example, indicates that TETRA attach is for delivery of the further root key K2 with which UE1 may perform the restricted access authentication. In response to message 10-4, UE1 sends message 10-5 to attach TETRA, which in turn triggers the TETRA authentication performed by messages 10-6, the TETRA authentication using TETRA-specific keys. As said above, in the illustrated example it is assumed that MSBS1 is configured to act as ACME for TETRA. Since the TETRA authentication succeeds in the illustrated example, there is a secure channel (secure side channel) over which the further root key K2 for SAE is sent, in message 10-7, from UE1 to MSBS1. It should be appreciated that in another implementation MSBS1 is configured to send said K2 over the secure channel to UE1.

Then UE1 sends again message 10-2. Since MSBS1 is in isolated mode, it captures, in point 10-8, the message and triggers, in point 10-8, authentication for SAE restricted access, i.e. authentication using K2. The authentication is performed by messages 10-9. In the illustrated example, the authentication succeeds.

UE1 then sends message 10-10 initiating a call to UE2. MSBS1 obtains, in point 10-11, routing information on UE2, and detects, in point 10-11, that UE1 is in restricted access but that UE2 is within the restricted access area, i.e. in the same radio access network for SAE as UE1. Therefore MSBS1 forwards message 10-10 to MSBS2 serving UE2 which then forwards the message to UE2.

In the illustrated example, UE2 is not attached to the network, and therefore sends message 10-2' indicating an attach to the network to MME via MSBS2. In the illustrated example, UE2 needs to be authenticated, there is no link failure between MSBS2 and MME containing authentication vectors for UE2, and MME triggers the authentication which is performed in messages 10-12. After that UE1 and UE2 can have the call (illustrated in messages 10-13). Although not illustrated, the call could be a local group call between user equipments in the radio access network or any other communication service provided by means of the radio access network. Another example of services includes messaging services. Typically MSBS1 and MSBS 2 are in the same radio access network but that need not to be the case; it suffices that they can communicate with each other.

The steps/points, signaling messages and related functions described above in FIGS. 4 to 10 are in no absolute chronological order, and some of the steps/points may be performed simultaneously or in an order differing from the given one. Other functions can also be executed between the steps/points or within the steps/points and other signaling messages sent between the illustrated messages. For example, step 506 may be performed between steps 607 and 609, and step 408 between steps 610 and 611. Some of the steps/points or part of the steps/points can also be left out or replaced by a corresponding step/point or part of the step/point. For example, steps 702, 704, 709 and 710 may be replaced by a step updating, if necessary the mode, and if updated to normal, step 705 and 708 may be performed. The signaling messages are only exemplary and may even comprise several separate messages for transmitting the same information. In addition, the messages may also contain other information.

It will be obvious to a person skilled in the art that, as technology advances, the inventive concept can be implemented in various ways. The invention and its embodiments are not limited to the examples described above but may vary within the scope of the claims.

The invention claimed is:

1. A method for a system comprising an access network and an authentication server configured to authenticate a user by means of a first shared secret, the method comprising:
   monitoring whether an access point node is in an isolated mode, in which the authentication server is not available for authentication purposes, or in a normal mode, in which the authentication server is available for authentication by means of the first shared secret;
   broadcasting information indicating whether the access point is in the isolated mode or the normal mode;
   during the isolated mode, authenticating the user in the access point node or in a node controlling the access point node by means of a second shared secret; and
   providing the user with a restricted network access when the authentication by means of the second shared secret succeeds.

2. A method as claimed in claim 1, further comprising:
   maintaining during the isolated mode information on each user authenticated by means of the second secret;
   detecting that the authentication server is again available for authentication purposes;
   transmitting the information on authenticated users to the authentication server for re-authentication.

3. A method as claimed in claim 1, wherein the first shared secret is a permanent root key that is never transmitted, and the second shared secret being a root key that can be used instead of the permanent root key in authentication algorithms and which may be transmitted over a secure connection.

4. A method for a user equipment configured to authenticate a user of the user equipment to a network by means of a first shared secret, the method comprising:
   receiving in the broadcast an indication on whether the network is in an isolated mode in which the authentication server is not available for authentication purposes or in a normal mode in which the authentication server is available for authentication by means of the first shared secret;

receiving an authentication request;

when the last broadcast indicated the normal mode, performing the authentication by means of the first shared secret; and when the last broadcast indicated the isolated mode, perforating the authentication by means of a second shared secret, wherein the first shared secret is a permanent root key that is never transmitted and the second shared secret is a mot key that can be used instead of the permanent root key in authentication algorithms and which may be transmitted over a secure connection.

5. A method as claimed in claim 4, wherein, when the last broadcast indicated the isolated mode, the method further comprises:

prompting the user on a restricted network access; and performing the authentication in response to receiving from the user an indication that the user accepts the restricted network access.

6. A method as claimed in claim 4, further comprising:

receiving a broadcast indicating the normal mode after one or more broadcasts indicating the isolated mode;

checking whether there is going on an isolated mode connection with a restricted network access; and sending a request triggering a network authentication, when there is an isolated mode connection going on.

7. A method as claimed in claim 6, wherein when there is an isolated mode connection going on, the method further comprises:

prompting the user on the possibility to obtain a full network access; and sending the request triggering the network authentication in response to receiving from the user an indication of the user wanting the full network access.

8. A communication system comprising:

an authentication centre comprising means for securely storing subscription-specific first shared secrets for authenticating corresponding users;

an authentication server configured to authenticate a user by means of a corresponding first shared secret;

an access network configured to maintain or securely obtain a second shared secret for authentication, to detect an isolated mode in which the authentication server is not available for authentication purposes; in response to the isolated mode, to authenticate a user by means of the second shared secret to provide the user with restricted access; and to broadcast information whether or not the access network is in the isolated mode; and user equipment comprising means for securely storing a first shared secret for authentication of the user of the user equipment, means for maintaining or securely obtaining a second shared secret for authentication, means for receiving information on a current mode of the access network in broadcast, means for receiving an authentication request, means for selecting a secret to be used m an authentication based on the current mode of the access network, the means for selecting being configured to select the second shared secret when the current mode is the isolated mode, otherwise select the first shared secret, and means for performing the authentication using the selected key.

9. A communication system as claimed in claim 8, wherein the access network comprises an access point node configured at least to perform said detection, broadcast and authentication.

10. A communication system as claimed in claim 9, wherein the communication system further comprises a second access network, the second access network being of other type than the access network, and the communication system is configured to establish a secure side channel between the user equipment and the access point node by means of the second access network and to deliver the second shared secret via the secure side channel.

11. A communication system as claimed in claim 9, wherein the access point node is a multistandard base station, node B or an evolved node B.

12. A communication system as claimed in claim 8, wherein the communication system is configured to provide the user equipment only services provided by means of the access network if the authentication is performed using the second shared secret.

13. User equipment, comprising:

at least one processor, and at least one memory for storing instructions to be executed by the processor, wherein the at least one memory and the instructions are configured to, with the at least one processor, cause the user equipment at least to:

securely store a first shared secret for authentication of the user of the user equipment;

maintain or securely obtain a second shared secret for authentication;

receive in a broadcast an indication on whether a network is in an isolated mode in which an authentication server is not available for authentication purposes or in a normal mode in which the authentication server is available for authentication by means of the first shared secret;

select, in response to receiving an authentication request, a secret to be used in an authentication based on the current mode of the network;

perform, in response to the last broadcast having indicated the normal mode, the authentication by means of the first shared secret; and prompt, in response to the last broadcast having indicated the isolated mode, the user on a restricted network access, and perform, in response to receiving from the user an indication that the user accepts the restricted network access, the authentication by means of the second shared secret.

\* \* \* \* \*